Oct. 22, 1968 G. GROTNESS 3,406,992
ANGULAR AND LATERAL SELF-ALIGNING ROD COUPLING
Filed May 8, 1964 2 Sheets-Sheet 1
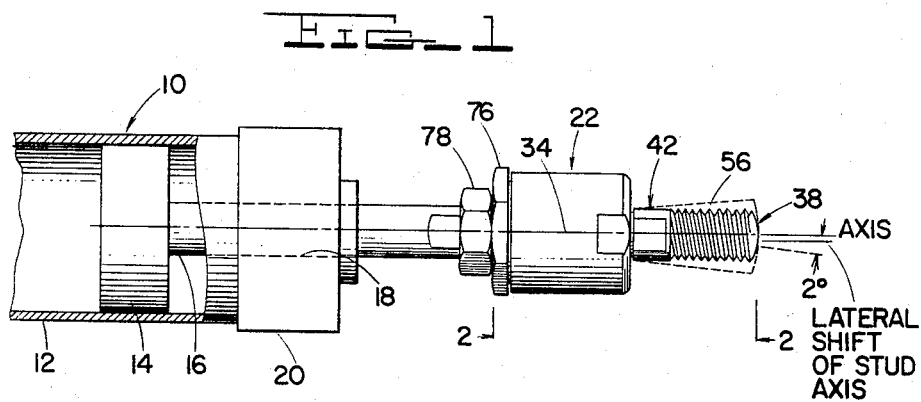
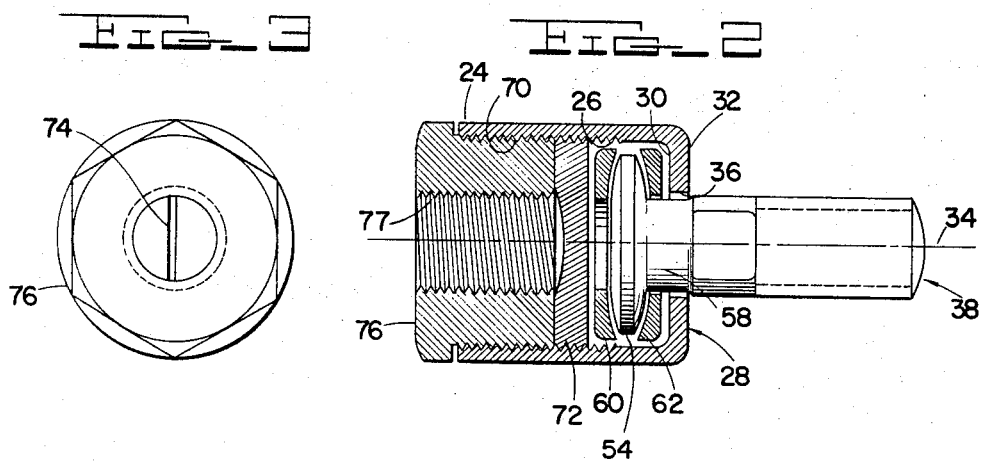
INVENTOR.
GUNNAR GROTNESS
BY Hood, Gust & Irish
ATTORNEYS Oct. 22, 1968   G. GROTNESS   3,406,992
ANGULAR AND LATERAL SELF-ALIGNING ROD COUPLING
Filed May 8, 1964   2 Sheets-Sheet 2
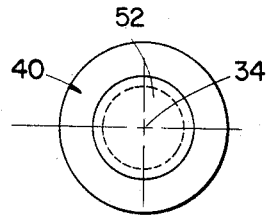
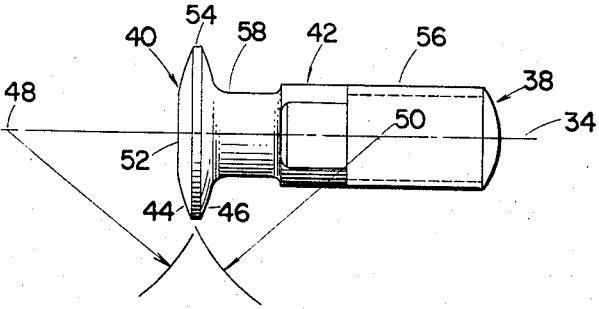
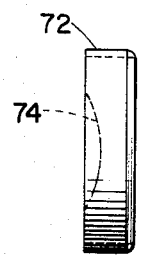
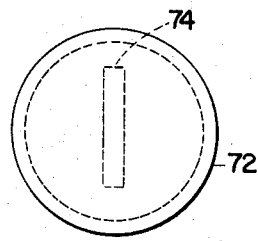
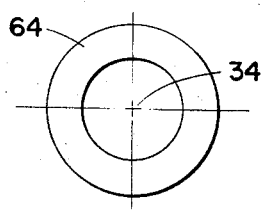
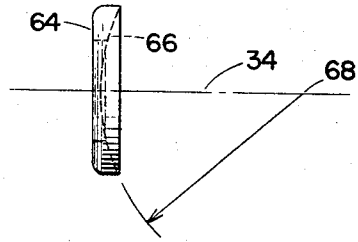
INVENTOR.
GUNNAR GROTNESS
BY Hood, Gust & Irish
ATTORNEYS United States Patent Office 3,406,992
Patented Oct. 22, 1968

3,406,992
ANGULAR AND LATERAL SELF-ALIGNING ROD COUPLING
Gunnar Grotness, Fort Wayne, Ind., assignor to Pneumatic-Hydraulic Development Co., Inc., Fort Wayne, Ind., a corporation of Indiana
Filed May 8, 1964, Ser. No. 366,028
7 Claims. (Cl. 287—91)

The present invention relates to an angular, lateral, self-aligning rod coupling and more particularly to an assembly for interconnecting the piston rod of a power cylinder and a part to be operated, and which functions such that if there is any misalignment between the piston rod and the part to be operated, the coupling will compensate for this without interfering with the operation of either the power cylinder or the part which is operated.

Conventionally, power cylinders having pistons and piston rods function such that the piston and the piston rods move rectilinearly with a minimum of lateral or angular displacement during movement. It is well known that if any lateral forces are applied to a piston rod during movement thereof, friction is introduced which interferes with the smooth, uninhibited functioning thereof. For this reason, it is oftentimes desirable to interpose a mechanism between the piston rod and the part to be operated whereby any binding forces which might be imparted to the piston rod by the operated part may be eliminated.

The present invention relates to such a mechanism, and one object of this invention is to provide a self-aligning rod coupling, which is efficient in operation, economical to build and is minimal in size.

It is another object of this invention to provide a self-aligning piston rod coupling whereby forces, tending to inhibit the piston rod of a power cylinder against rotation of rectilinear movement, may be substantially minimized or entirely eliminated even though the part which is to be operated by the piston rod may not be truly axially aligned therewith and additionally may be held against rotation or may even itself rotate.

It is still another object of this invention to provide a self-aligning piston rod coupling capable of overcoming problems due to lateral and/or tilting misalignment between a piston rod and a part to be operated.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevation of an embodiment of this invention showing a power cylinder in fragmentary form which is partially sectioned;

FIG. 2 is an axial sectional view, drawn substantially to scale, of an embodiment of the coupling of this invention;

FIG. 3 is an end view of the embodiment of FIG. 2;

FIGS. 4a and 4b are side and end views, respectively, drawn substantially to scale, of the stud portion of the embodiment of FIG. 2;

FIGS. 5a and 5b, drawn substantially to scale, are side and end views, respectively, of the adjusting screw used in the arrangement of FIG. 2; and FIGS. 6a and 6b, which are drawn substantially to scale, are front and side views, respectively, of one of the annular bearing members used in the arrangement of FIG. 2.

Referring to the drawings, and more particularly to FIG. 1, a conventional, fluid power cylinder, indicated generally by the reference numeral 10 is composed of the usual cylinder 12 and piston 14 which is reciprocally received thereby. The cylinder and piston 12, 14 arrangement are conventionally constructed such that the piston 14 may rotate inside the cylinder 12 but still provide a suitable seal against leakage of the pressure fluid which is used to operate the piston 14.

The piston rod 16 is centrally secured to the piston 14 and projects through an elongated bearing opening 18 in an end block 20 of the cylinder 12. The diameters of the piston rod 16 and bearing opening 18 are substantially coextensive such that the piston rod 16 is limited substantially exclusively to only rectilinear movement in the opening 18. This opening or bearing 18 is conventional in this regard and may be considered as a guide, therefore, for the piston rod 16 whereby the latter moves axially only. This being true, if any lateral or radial force is exerted on the piston rod 16, a substantial frictional force is developed between the piston rod and the bearing opening 18 which inhibits movement of the piston rod 16.

The coupling of this invention, which is removably secured to the distal end of the piston rod 16, is indicated generally by the reference numeral 22, and comprises a tubular housing 24 having a cylindrical, inner wall 26 which is of uniform diameter throughout the length thereof. The right-hand end of this housing 24, as viewed in FIG. 2, is turned inwardly, or otherwise is provided with an end wall 28 having inner and outer surfaces, respectively, 30 and 32 which are flat and lie in planes normal to the axis 34 of the housing 24. This end wall 28 is provided with a circular, coaxial opening 36 which serves a purpose which will be explained more fully later on.

A stud, generally indicated by the numeral 38, illustrated alone in FIGS. 4a and 4b, is provided with head and stem portions 40 and 42, respectively. The head 40 is circular in shape and concentric about the stud axis and the axis 34 when the stud is centered in the housing 24. Further than this, the head 40 is more flat than round and is provided on the opposite sides thereof with two coaxial, opposite annular surface portions 44 and 46 which are part-spherical in shape. These surfaces 44 and 46 may be considered as being allochiral. The centers of curvatures 48 and 50, respectively, of the annular surface portions 44 and 46 lie on the axis 34 but on opposite sides of the head 40 as shown more clearly in FIG. 4a. The radii of these two surfaces 44 and 46 are, in a working embodiment of the invention, identical, such that the two surfaces 44 and 46 may be regarded as mirror images of each other.

The central portion of the left-hand surface of the head 40, inside the annular part-spherical portion 44, is flat and normal to the axis 34 as shown. The size of this surface portion 52 is substantially the same as the cross-sectional size of the stem 42. The periphery 54 of the head 40 in shape corresponds to a short axial segment of a cylinder and has a dimension which will be given herein later on.

The stem 42 is composed of two axial portions, the first being a threaded portion 56 and the second being a reduced diameter throat portion 58. This throat portion 58 interconnects the right-hand side (FIG. 4a) of the head 40 with the threaded portion 56 of the stem. The throat portion 58 has a short axial length and is of uniform diameter throughout this length.

The stud 38 is assembled into the housing 24, as shown more clearly in FIG. 2, with the throat portion 58 in registry with the opening 36. As is clearly shown in FIG. 2, the throat portion 58 is of smaller diameter than the opening 36 such that a definite circumferential clearance is provided therebetween when the axis of the stud 38 coincides with the axis 34 of the housing 24.

Shown in FIG. 2 and also in FIGS. 6a and 6b are two annular bearing members 60 and 62, these members being, in a working embodiment of this invention, identical in size and shape. A description of one of these members will thereby suffice for both. As more clearly shown in FIGS. 6a and 6b, the member resembles a conventional washer but differs in the respect that one side 64 is flat and the other side 66 is part spherical. The flat side 64 lies in a plane normal to the axis 34 (this being the axis of the housing 24 when the member is centrally assembled into the housing), and the part-spherical surface 66 has its center 68 of curvature on the axis 34 as shown. The radius of curvature of this surface 66 is, in a working embodiment of this invention, identical to the radius of curvature of the two surfaces 44 and 46.

The outer diameter of each member 60, 62 is preferably substantially equal to or the same as the outer diameter of the head 40. The inner diameter of each member 60, 62 is substantially coextensive and equal to the diameter of the surface portion 52 of the head 40.

The two bearing members 60 and 62 are assembled onto the head 40 as shown more clearly in FIG. 2, the member 62 being interposed between the end wall 28 and the surface portion 46 and the member 60 being assembled onto the surface portion 44. The curved surfaces 66 of the bearing members 60, 62 are slidably engaged with the companion surfaces 44, 46 of the head 40, and further than this the curved surface portions of the bearing members 60, 62 are made substantially coextensive and of about the same area as the curved surface portions 44 and 46 of the head 40.

As is clearly shown in FIG. 2, the inner diameter of the bearing member 62 is larger than the outer diameter of the throat portion 58 of the stud 38. This provides a circumferential clearance between these two parts when all of the parts thus far described are centered in the housing 24 such that the axes thereof coincide.

The inner wall 26 of the housing 24 is partially threaded at 70 thereby leaving a smooth wall surface in the region occupied by the assembly 40, 60, 62. Into this threaded portion 70 is inserted a disc-shaped screw 72 which is shown in detail in FIGS. 5a and 5b. This screw is relatively short axially and is provided in one surface with a screwdriver slot 74. This screw 72 usually is threaded into the housing 24 to a position at which it lightly engages the flat side of the bearing member 60 and forces this member as well as the head 40 and member 62 into operative sliding engagement with the inner surface 30 of the end wall 28. This adjustment will be more fully described hereinafter.

A somewhat larger, coupling screw 76 as shown in FIG. 2 is threaded into the housing 24 into intimate abutting engagement with the adjusting screw 72. This screw 76 is provided with an internally threaded bore 77 and this bore 77 is adapted to receive the threaded distal end of the piston rod 16 of FIG. 1. A lock nut 78 is preferably used for locking the piston rod 16 to the coupling screw 76.

Referring more specifically to the individual parts which have already been described, the stud 38 is preferably formed of steel which is hardened and drawn. The surfaces of the head 40 are made relatively smooth so as to have minimal friction when slidingly engaged with the bearing members 60 and 62.

The bearing members 60 and 62 are made of steel which is hardened and drawn. The surfaces thereof are made as smooth as possible for the purpose of minimizing friction.

The adjusting screw 72 is preferably made of suitable steel which is case-hardened. The screw 76 is formed of softer steel so as to obtain a biting or locking engagement with the screw 72 when the former is turned downwardly thereagainst.

Under some conditions of operation, it may be desirable for the stud 38 to be held rigid with respect to the housing 24 in coaxial or offset relation therewith. This is accomplished by inserting a screwdriver through the bore 77 of the coupling screw 76 and into the slot 74 in the screw 72. The latter is then turned inwardly against the bearing member 60 until the head 40 and bearing member 62 are securely clamped against the inner, smooth surface of the end wall 28. By reason of the part-spherical shape of the opposite surfaces on the head 40, the axis of the stud 38 may be positioned in alignment with the axis of the housing 24. Also, the stud 38 will be locked against movement with respect to the housing 24.

If it is desired for the stud 38 to be movable relative to the housing 24, the same procedure just described is followed. However, the coupling screw 76 is backed outwardly a few turns following which the screw 72 is backed away from the bearing 60 by a slight amount until the head 40 is able to move with respect to the housing 24.

By reason of the fact that the head 40 is of smaller diameter than the wall 26 of the housing, a circumferential clearance is provided therebetween which, in combination with the clearance provided between the end wall 28 and the stem 42, the entire stud 38 is capable of moving laterally, or radially with respect to the housing 24. This lateral or radial shifting is of such nature as to permit the axis of the stud 38 to remain parallel with the axis 34 of the housing 24. This lateral shifting is accomplished by the sliding movement of the right-hand face (FIG. 2) of the bearing member 62 against the inner face 30 of the end wall 28 as well as the sliding engagement of the left-hand face of the bearing member 60 with the right-hand face of the adjusting screw 72. This latter face is arranged such that it defines a plane normal to the axis 34.

In this same, last-mentioned adjusted position of the screw 72, the stud 38 may be tilted with respect to the housing 24. This is accomplished merely by relative sliding movement of the annular surfaces 44 and 46 on the companion surfaces of the bearing members 60 and 62. Inasmuch as these surfaces are part-spherical, and about centers which are spaced relatively far from the head 40, angular or tilting displacement of the stud 38 may be accommodated without in the slightest impairing effective bearing contact, or in other words, available bearing area, within the assembly. This tilting movement obviously may be accomplished without any lateral displacement of the stud, and the extent of tilting will be determined in part by engagement of the throat portion 58 of the stem 42 with the edge of the opening 36. Now, it will be apparent that if the screw 72 is backed farther away from the bearing member 60, some additional tilting angle may be obtained by reason of the fact that the head 40 within the housing 24 may move at a greater angle while the stud itself 38 is moved in an axial direction enough to accommodate this greater movement. It will now be seen that the particular adjustment or position of the screw 72 will determine the tilting angle as well as the frictional force within the assembly which would resist tilting or lateral movement of the stud.

From the foregoing, it will be apparent that inasmuch as the stud 38 can move both laterally and angularly, separately, it can also move in both directions simultaneously. Additionally, the stud is capable of rotating inside of the housing 24 by reason of this smooth bearing contact between the head 40 and the two bearing members 60, 62.

Now considering that the coupling of FIG. 2 is assembled to a power cylinder 10 and that the threaded portion 56 of the stem 42 is securely attached to a part which is limited in its movement to true reciprocation rectilinearly, any inaccuracy in alignment between this part which is operated and the piston rod 16 will be accommodated by the coupling 22 when the adjusting screw 72 of the latter is properly set. If the part to be operated is slightly angularly misaligned with respect to the axis of the piston rod 16, the sliding action of the head 40 on the bearing members 60 and 62 will accommodate this misalignment without applying any binding forces on either the piston rod 16 or the piston 14. By reason of the substantial area of contact between the members 60 and 62 and the head 40, the same forces may be transferred to the part being operated, by the piston 14, as would be the case if there were true axial alignment. Also, since the opposite sides of the head 40 are substantially identical in size and shape, the coupling 22 may be operated in both push and pull directions with equal facility and effectiveness. Full force in both directions of operation may be impaired to the part being operated.

This same operating condition and effectiveness in transmittal of forces is present if the part to be operated has its axis of reciprocation slightly offset to one side of the axis 34 of the housing 24. In this event, the stud 38 merely shifts to one side without reducing the bearing areas inside the mechanism which are instrumental in transmittal of the forces. If there should be any variation in the lateral or tilting movement of the part being reciprocated, the stud 38 obviously can move correspondingly without imparting any binding forces on the piston rod 16.

Among the advantages residing in the present invention are the ones of increasing cylinder efficiency by eliminating friction caused by misalignment; the compensation for angular error and lateral misalignment on both the push and pull strokes; the reduction in cylinder and component wear; the simplification of alignment problems between the power cylinder and the part to be operated; and others which will become apparent to the person skilled in the art.

In the prior art, couplings, which to some extent compensate for misalignment, have been used. However, these couplings are designed differently and contain screw and nut members which are mounted externally of a body or supporting element. In contrast therewith, the present invention has all of its parts internally of a body or supporting element in the form of the housing 24. By this means, the overall size of the coupling unit can be made smaller than is possible in the external design just mentioned.

In a working embodiment of this invention, the various parts in the coupling 22 have dimensions as set forth in the following. However, it is to be understood that these dimensions are given by way of example only and are not intended to constitute a limitation on the coverage of the claims appended hereto.

| | | |
|---|---|---|
| Diameter of wall 26 | inch | .6875 |
| Diameter of opening 36 | do | .375 |
| Radius of curvature of surfaces 44, 46, 66 | do | ¾ |
| Diameter of head 40 | do | .625 |
| Axial length of periphery 54 | do | 1/32 |
| Diameter of surface portion 52 | do | 5/16 |
| Diameter of throat 58 | do | .312 |
| Approximate length of throat 58 | do | ¼ |
| Diameter of stem 42 | do | ⅜ |
| Outer diameter of members 60, 62 | do | .625 |
| Inside diameter of members 60, 62 | do | .375 |
| Rockwell "C" hardness of members 60, 62 | do | 35 |
| Thickness of screw 72 | do | 3/16 |
| Length of screw 76 | do | ½ |
| Thickness of members 60, 62 | do | 3/32 |

While there have been described above the principles of this invention in connection with specific apparatus, it is to be clearly understood that this description is made only by way of example and not as a limitation to the scope of the invention.

What is claimed is:

1. A coupling of the character described comprising a tubular housing having opposite ends and a cylindrical inner wall which is of substantially uniform diameter between said opposite ends, said housing having on one of said ends a flat end wall which is normal to the axis of said housing, said end wall having a circular coaxial opening therein and defining flat annular inner and outer end surfaces, said cylindrical wall being divided into two axially extending portions in end-to-end relation, one of said portions adjacent to said inner end surface being relatively smooth and the other of said portions being threaded; an elongated stud having a circular head and a stem extending coaxially therefrom, said head being relatively flat with the diameter thereof being at least four times longer than the thickness thereof, said thickness being measured along the axis of said stud and said diameter being measured at right angles thereto, said head having two opposite annular surface portions which are part-spherical in shape, one of said annular surface portions being disposed on the side of said head opposite from said stem, the other of said annular surface portions being disposed on the side of said head adjacent to said stem, the centers of curvatures of said surface portions lying on the axis of said stud on the opposite sides, respectively, of said head, the radii of curvatures of said surface portions being substantially equal, said radii having a length at least twice as long as the radius of said head, the inner diameters of said annular surface portions being substantially equal to the diameter of said stem, the diameter of said head being larger than the diameter of said stem, the portion of the surface of said head inside said one annular surface portion being flat and normal to the axis of said stud, said stud having a reduced diameter cylindrical throat portion disposed between said head and said stem, said stud being movably assembled to said housing with said head being coaxially positioned inside said housing and said stem projecting beyond said end wall opening, said throat portion being disposed radially inside said opening, the diameter of said head being smaller than the diameter of said cylindrical inner wall to provide for radial clearance therebetween, the diameter of said throat portion being smaller than the diameter of said opening to provide for radial clearance therebetween, the aforesaid diameters of said head and throat portion being so related to the diameters of said inner wall and opening, respectively, to make the aforesaid radial clearances substantially equal; two annular bearing members of substantially identical shape and size; each said bearing member having opposite surfaces of which one is flat and the other concave spherical, said one flat bearing surface being normal to the axis of the bearing member, the other concave spherical surface of said bearing member having a center of curvature on the last-mentioned axis, the radius of the last-mentioned curvature being equal to the radius of curvature of said annular surface portions; one of said bearing members coaxially surrounding said throat portion and being interposed between said head and said end wall, the flat surface of said one member being slidably engageable with the inner surface of said end wall and the concave spherical surface thereof being slidably engageable with the other of said annular surface portions, the diameter of said throat portion being smaller than the inner diameter of said one bearing member, the other bearing member being slidably engaged with said one annular surface in coaxial relation therewith, said bearing members having outer diameters which are substantially equal to the outer diameter of said head, the areas of the concave spherical surfaces of said members being substantially equal to and coextensive with the areas of said annular surface portions, respectively; a disc-shaped adjusting screw having flat and parallel opposite sides threaded into said housing into operative sliding engagement with said other bearing member, said screw being adjustable to an extent capable of clamping said bearing members and stud head against said end wall; a coupling screw threadedly received by said housing and being engageable with said adjusting screw on the side opposite said stud, said coupling screw having a coaxial bore which is threaded, said adjusting screw being of harder material than said coupling screw; said screws being adjustable to a position at which said stud is capable of tilting or lateral movement in said housing and both tilting and lateral movements simultaneously in said housing.

2. In combination with the coupling of claim 1, a power cylinder mechanism comprising a cylinder, a piston reciprocably received by said cylinder, said cylinder having a head block which is provided with an elongated uniform diameter bearing opening, a piston rod having opposite ends, said rod being coaxially secured at one end to said piston and being reciprocally received by said bearing opening, said bearing opening and said piston rod having a close sliding fit therebetween whereby said piston rod is held against lateral movement during reciprocation thereof, the other end of said piston rod being threaded and received by the threaded bore in said coupling screw.

3. A coupling of the character described comprising a tubular housing having opposite ends and a cylindrical inner wall which is of substantially uniform diameter between said opposite ends, said housing having on one of said ends a flat end wall which is normal to the axis of said housing, said end wall having a circular coaxial opening therein thereby defining flat annular inner and outer end surfaces, said cylindrical wall being divided into two axially extending portions in end-to-end relation, one of said portions adjacent to said inner end surface being relatively smooth and the other of said portions being threaded; an elongated stud having a circular head and a stem extending coaxially therefrom, said head being relatively flat with the diameter thereof being at least four times longer than the thickness thereof, said thickness being measured along the axis of said stud and said diameter being measured at right angles thereto, said head having two opposite annular surface portions which are part-spherical in shape, one of said annular surface portions being disposed on the side of said head opposite from said stem, the other of said annular surface portions being disposed on the side of said head adjacent to said stem, the centers of curvatures of said surface portions lying on the axis of said stud on the opposite sides, respectively, of said head, the radii of curvatures of said surface portions being substantially equal, said radii being a length at least twice as long as the radius of said head, the inner diameters of said annular surface portions being substantially equal to the diameter of said stem, the diameter of said head being larger than the diameter of said stem, the portion of the surface of said head inside said one annular surface portion being flat and normal to the axis of said stud, said stud having a reduced diameter cylindrical throat portion disposed between said head and said stem, said stem being externally threaded; said stud being movably assembled to said housing with said head being coaxially positioned inside said housing and said stem projecting beyond said end wall opening, said throat portion being disposed radially inside said opening, the diameter of said head being smaller than the diameter of said cylindrical inner wall to provide for radial clearance therebetween, the diameter of said throat portion being smaller than the diameter of said opening to provide for radial clearance therebetween, the aforesaid diameters of said head and throat portion being so related to the diameters of said inner wall and opening, respectively, to make the aforesaid radial clearances substantially equal; two annular bearing members of substantially identical shape and size; each said bearing member having opposite surfaces of which one is flat and the other concave spherical, said one flat bearing surface being normal to the axis of the bearing member, the other concave spherical surface of said bearing member having a center of curvature on the last-mentioned axis, the radius of the last-mentioned curvature being equal to the radius of curvature of said annular surface portions; one of said bearing members coaxially surrounding said throat portion and being interposed between said head and said end wall, the flat surface of said one member being slidably engageable with the inner surface of said end wall and the concave spherical surface thereof being slidably engageable with the other of said annular surface portions, the diameter of said throat portion being smaller than the inner diameter of said one bearing member, the other bearing member being slidably engaged with said one annular surface in coaxial relation therewith, said bearing members having outer diameters which are substantially equal to the outer diameter of said head, the areas of the concave spherical surfaces of said members being substantially equal to and coextensive with the areas of said annular surface portions, respectively; a disc-shaped adjusting screw having flat and parallel opposite sides threaded into said housing into operative sliding engagement with said other bearing member, said screw being adjustable to an extent capable of operatively engaging said bearing member and stud head against said end wall.

4. A coupling of the character described comprising a tubular housing having opposite ends and a cylindrical inner wall which is of substantially uniform diameter between said opposite ends, said housing having on one of said ends a flat end wall which is normal to the axis of said housing, said end wall having a circular coaxial opening therein thereby defining flat annular inner and outer end surfaces, said cylindrical wall being divided into two axially extending portions in end-to-end relation, one of said portions adjacent to said inner end surface being relatively smooth and the other of said portions being threaded; an elongated stud having a circular head and a stem extending coaxially therefrom, said head being relatively flat with the diameter thereof being longer than the thickness thereof, said thickness being measured along the axis of said stud and said diameter being measured at right angles thereto, said head having two opposite annular surface portions which are part-spherical in shape, one of said annular surface portions being disposed on the side of said head opposite from said stem, the other of said annular surface portions being disposed on the side of said head adjacent to said stem, the centers of curvatures of said surface portions lying on the axis of said stud on the opposite sides, respectively, of said head, the radii of curvatures of said surface portions being substantially equal, said radii having a length at least twice as long as the radius of said head, the inner diameters of said annular surface portions being substantially equal to the diameter of said stem, the diameter of said head being larger than the diameter of said stem, the portion of the surface of said head inside said one annular surface portion being flat and normal to the axis of said stud, said stud having a cylindrical throat portion disposed between said head and said stem, said stem being externally threaded; said stud being movably assembled to said housing with said head being coaxially positioned inside said housing and said stem projecting beyond said end wall opening, said throat portion being disposed radially inside said opening, the diameter of said head being smaller than the diameter of said cylindrical inner wall to provide for radial clearance therebetween, the diameter of said throat portion being smaller than the diameter of said opening to provide for radial clearance therebetween, two annular bearing members of substantially identical shape and size; each said bearing member having opposite surfaces of which one is flat and the other concave spherical, said one flat bearing surface being normal to the axis of the bearing member, the other concave spherical surface of said bearing member having a center of curvature on the last-mentioned axis, the radius of the last-mentioned curvature being equal to the radius of curvature of said annular surface portions; one of said bearing members coaxially surrounding said throat portion and being interposed between said head and said end wall, the flat surface of said one member being slidably engageable with the inner surface of said end wall and the concave spherical surface thereof being slidably engageable with the other of said annular surface portions, the diameter of said throat portion being smaller than the inner diameter of said one bearing member, the other bearing member being slidably engaged with said one annular surface in coaxial relation therewith, said bearing members having outer diameters which are substantially equal to the outer diameter of said head, the areas of the concave spherical surfaces of said members being substantially equal to and coextensive with the areas of said annular surface portions, respectively; a disc-shaped adjusting screw having flat and parallel opposite sides threaded into said housing into operative sliding engagement with said other bearing member, said screw being adjustable to an extent capable of operatively engaging said bearing members and stud head against said end wall.

5. A coupling of the character described comprising a housing having opposite ends and a cylindrical inner wall which is of substantially uniform diameter between said opposite ends, said housing having an end wall on one of said ends which is provided with a flat radially extending inner end surface, said end wall having a coaxially disposed opening therein, an elongated stud having a circular head and a stem extending coaxially therefrom, said head being relatively flat with the diameter thereof being longer than the thickness thereof, said thickness being measured along the axis of said stud and said diameter being measured at right angles thereto, said head having two opposite annular surface portions which are part-spherical in shape, one of said annular surface portions being disposed on the side of said head opposite from said stem, the other of said annular surface portions being disposed on the side of said head adjacent to said stem, the centers of curvatures of said surface portions lying on the axis of said stud on the opposite sides, respectively, of said head, the radii of curvatures of said surface portions being substantially equal, said radii having a length at least twice as long as the radius of said head, the inner diameters of said annular surface portions being substantially equal to the diameter of said stem, the diameter of said head being larger than the diameter of said stem, the portion of the surface of said head inside said one annular surface portion being flat and normal to the axis of said stud, said stud having a cylindrical throat portion disposed between said head and said stem, said stem being externally threaded; said stud being movably assembled to said housing with said head being coaxially positioned inside said housing and said stem projecting beyond said end wall opening, said throat portion being disposed radially inside said opening, the diameter of said head being smaller than the diameter of said cylindrical inner wall to provide for radical clearance therebetween, the diameter of said throat portion being smaller than the diameter of said opening to provide for radial clearance therebetween, two annular bearing members of substantially identical shape and size; each said bearing member having opposite surfaces of which one is flat and the other concave spherical, said one flat bearing surface being normal to the axis of the bearing member, the other concave spherical surface of said bearing member having a center of curvature on the last-mentioned axis, the radius of the last-mentioned curvature being equal to the radius of curvature of said annular surface portions; one of said bearing members coaxially surrounding said throat portion and being interposed between said head and said end wall, the flat surface of said one member being slidably engageable with the inner surface of said end wall and the concave spherical surface thereof being slidably engageable with the other of said annular surface portions, the diameter of said throat portion being smaller than the inner diameter of said one bearing member, the other bearing member being slidably engaged with said one annular surface portion in coaxial relation therewith, said bearing members having outer diameters which are substantially equal to the outer diameter of said head, the areas of the concave spherical surfaces of said members being substantially equal to and coextensive with the areas of said annular surface portions, respectively; and means for adjustably positioning said two members and said head as an assembly against said flat inner end surface.

6. A coupling of the character described comprising a tubular housing having opposite ends and a cylindrical inner wall which is of substantially uniform diameter between said opposite ends, said housing having on one of said ends a flat end wall which is normal to the axis of said housing, said end wall having a circular coaxial opening therein thereby defining flat annular inner and outer end surfaces, said cylindrical wall being divided into two axially extending portions in end-to-end relation, one of said portions adjacent to said inner end surface being relatively smooth and the other of said portions being threaded; an elongated stud having a circular head and a stem extending coaxially therefrom, said head being relatively flat with the diameter thereof being at least four times longer than the thickness thereof, said thickness being measured along the axis of said stud and said diameter being measured at right angles thereto, said head having two opposite annular and curved surface portions, one of said annular surface portions being disposed on the side of said head opposite from said stem, the other of said annular surface portions being disposed on the side of said head adjacent to said stem, the centers of curvatures of said surface portions lying on the axis of said stud, respectively, the radii of curvature of said surface portions being substantially equal, said radii being a length at least twice as long as the radius of said head, the inner diameters of said annular surface portions being substantially equal to the diameter of said stem, the diameter of said head being larger than the diameter of said stem, the portion of the surface of said head inside said one annular surface portion being flat and normal to the axis of said stud, said stud having a reduced diameter cylindrical throat portion disposed between said head and said stem, said stem being externally threaded; said stud being movably assembled to said housing with said head being coaxially positioned inside said housing and said stem projecting beyond said end wall opening, said throat portion being disposed radially inside said opening, the diameter of said head being smaller than the diameter of said cylindrical inner wall to provide for radial clearance therebetween, the diameter of said throat portion being smaller than the diameter of said opening to provide for radial clearance therebetween, the aforesaid diameters of said head and throat portion being so related to the diameters of said inner wall and opening, respectively, to make the aforesaid radial clearances substantially equal; two annular bearing members of substantially identical shape and size; each said bearing member having opposite surfaces of which one is flat and the other curved, said one flat bearing surface being normal to the axis of the bearing member, the other and curved surface of said bearing member having a center of curvature on the last-mentioned axis, the radius of the last-mentioned curvature being equal to the radius of curvature of said annular surface portions, the curvature of said other bearing surfaces being complementary to the curvature of said annular surface portions; one of said bearing members coaxially surrounding said throat portion and being interposed between said head and said end wall, the flat surface of said one member being slidably engageable with the inner surface of said end wall and the curved surface thereof being slidably engageable with the other of said annular surface portions, the diameter of said throat portion being smaller than the inner diameter of said one bearing member, the other bearing member being slidably engaged with said one annular surface in coaxial relation therewith, said bearing members having outer diameters which are substantially equal to the outer diameter of said head, the areas of the curved surfaces of said members being substantially equal to and coextensive with the areas of said annular surface portions, respectively; a disc-shaped adjusting screw having flat and parallel opposite sides threaded into said housing into operative sliding engagement with said other bearing member, said screw being adjustable to an extent capable of operatively engaging said bearing member and stud head against said end wall.

7. A coupling of the character described comprising a housing having opposite ends and a cylindrical inner wall which is of substantially uniform diameter between said opposite ends, said housing having on one of said ends a flat end wall which is normal to the axis of said housing, said end wall having a coaxial opening therein thereby defining flat annular inner and outer end surfaces, said cylindrical wall being divided into two axially extending portions in end-to-end relation, one of said portions adjacent to said inner end surface being relatively smooth and the other of said portions being threaded; an elongated stud having a circular head and a stem extending coaxially therefrom, said head being relatively flat with the diameter thereof being longer than the thickness thereof, said thickness being measured along the axis of said stud and said diameter being measured at right angles thereto, said head having two opposite annular and curved surface portions, one of said annular surface portions being disposed on the side of said head opposite from said stem, the other of said annular surface portions being disposed on the side of said head adjacent to said stem, the centers of curvatures of said surface portions lying on the axis of said stud, respectively, the radii of curvatures of said surface portions being substantially equal, said radii having a length longer than the radius of said head, the inner diameters of said annular surface portions being substantially equal to the diameter of said stem, the diameter of said head being larger than the diameter of said stem, the portion of the surface of said head inside said one annular surface portion being generally flat and normal to the axis of said stud, said stud having a cylindrical portion disposed between said head and said stem, said stem having connecting means thereon; said stud being movably assembled to said housing with said head being coaxially positioned inside said housing and said stem projecting beyond said end wall opening, said cylindrical portion being disposed radially inside said opening, the diameter of said head being smaller than the diameter of said cylindrical inner wall to provide for radial clearance therebetween, the diameter of said cylindrical portion being smaller than the diameter of said opening to provide for radial clearance therebetween, two annular bearing members of substantially identical shape and size; each said bearing member having opposite surfaces of which one is flat and the other curved, said one flat bearing surface being normal to the axis of the bearing member, the other and curved surface of said bearing member having a center of curvature on the last-mentioned axis, the radius of the last-mentioned curvature being equal to the radius of curvature of said annular surface portions, the curvature of said other bearing surfaces being complementary to the curvature of said annular surface portions; one of said bearing members coaxially surrounding said throat portion and being interposed between said head and said end wall for substantially the full radial extent of the other of said annular surface portion, the flat surface of said one member being slidably engageable with the inner surface of said end wall and the curved surface thereof being slidably engageable with the other of said annular surface portions, the diameter of said cylindrical portion being smaller than the inner diameter of said one bearing member, the other bearing member being slidably engaged with said one annular surface in coaxial relation therewith, said bearing members having outer diameters which are substantially equal to the outer diameter of said head, the areas of the curved surfaces of said members being substantially equal to and coextensive with the areas of said annular surface portions, respectively; means having flat and parallel opposite sides threaded into said housing into operative sliding engagement with said other bearing member, said means being adjustable to an extent capable of operatively engaging said bearing members and stud head against said end wall.

References Cited

UNITED STATES PATENTS

| 1,150,892 | 8/1915 | Sherwood | 59—95 |
| 2,431,476 | 11/1947 | Hall | 279—16 |
| 2,940,786 | 6/1960 | Horning | 287—87 |

FOREIGN PATENTS

| 5,652 | 1905 | Great Britain. |
| 231,715 | 4/1925 | Great Britain. |
| 901,628 | 11/1944 | France. |

CARL W. TOMLIN, *Primary Examiner.*

A. KUNDRAT, *Assistant Examiner.*